United States Patent [19]

Jennings

[11] 4,370,909

[45] Feb. 1, 1983

[54] HAND GUARD FOR TABLE MOUNTED CUTTING TOOL

[76] Inventor: G. Craig Jennings, 2225 Laguna Canyon Rd., Laguna Beach, Calif. 92651

[21] Appl. No.: 241,244

[22] Filed: Mar. 6, 1981

[51] Int. Cl.³ .......................................... B27B 25/10
[52] U.S. Cl. ..................... 83/437; 83/435.1; 83/68; 83/478; 144/242 R; 144/251 R
[58] Field of Search .................... 83/478, 437, 435.1, 83/707, 701, 68; 144/242 R, 251 R

[56] References Cited

U.S. PATENT DOCUMENTS

| 686,339 | 11/1901 | Ritchie | 144/251 R |
| 2,410,467 | 11/1946 | Valentine | 83/437 |
| 2,522,965 | 9/1950 | Schaufelberger | 83/435.1 X |
| 2,681,691 | 6/1954 | Norris | 144/242 R |
| 2,929,419 | 3/1960 | Johnson | 83/435.1 |
| 3,598,162 | 8/1971 | Rosenthal | 83/68 |

FOREIGN PATENT DOCUMENTS

| 1000590 | 1/1957 | Fed. Rep. of Germany | 83/707 |
| 4410 | 12/1919 | Netherlands | 144/251 R |

Primary Examiner—Donald R. Schran
Attorney, Agent, or Firm—Fulwider, Patton, Rieber, Lee & Utecht

[57] ABSTRACT

A hand guard for a table mounted cutting tool. The guard includes a grooved underside adapted to rest on top of the work, and further includes a vertically movable heel for engaging the edge of the work to be advanced past the cutting tool.

5 Claims, 4 Drawing Figures

HAND GUARD FOR TABLE MOUNTED CUTTING TOOL

BACKGROUND OF THE INVENTION

1. Field of the Invention

The present invention relates to a portable hand guard for a table mounted cutting tool for movement with work to be advanced past the cutting tool.

2. Description of the Prior Art

An operator of a table mounted cutting tool such as a table saw must be able to hand feed work past the saw blade without danger of injuring himself through contact with the blade.

Present cutting tool guards are frequently of complex construction, are relatively expensive, and interfere unduly with normal use of the power tool. For example, many guards for table saws are fixed to the table in a position in which they extend out over the blade. These move away from the saw blade as the work is advanced, but they also have to be lifted out of the way in order to view the work area, or to adjust the saw, or to perform any of various other operations. Consequently, operators often regard such guards as a nuisance, remove them and thereby expose themselves to serious injury.

It is also common practice in the prior art to dispense with use of any guard, simply utilizing a length of scrap wood to push the work past the saw blade. This usually results in unwanted vibration or chattering of the loosely held work, and also makes it difficult to hold small workpieces, such as in sawing relatively narrow strips from a workpiece.

SUMMARY OF THE INVENTION

According to the present invention a hand guard for a table mounted cutting tool is provided which is preferably made of transparent plastic so that the relative locations of the cutting tool and the work can be observed. The guard includes a vertically oriented guide body having flat side portions which are slidable along the usual table mounted guide rail. The guide body includes an underside adapted to rest on top of the work and, in one embodiment, includes a recess to receive the cutting portion of the cutting tool as it cuts through the work. The recess preferably defines a narrow downwardly projecting portion engageable with the top of the work so that the work can be cut into narrow strips, or otherwise formed to close tolerances, while being positively held in position by the downwardly projecting portion of the guide body.

The guide body preferably includes a sloping handle opening to permit the work to be advanced the length of the operator's arm without having to uncomfortably cock the wrist in the process.

A vertically elongated heel is mounted to the trailing extremity of the guide body for generally vertical movement whereby its lower extremity is projectable for positive engagement with the end of the work. Adjustment means are provided on the heel and the guide body to fix the heel in various predetermined vertically adjusted positions. In one embodiment the guide body includes signal transmitter means which can be trigger operated to actuate a receiver associated with the power tool whereby the operator can turn the tool on and off while holding the hand guard.

DESCRIPTION OF THE PREFERRED EMBODIMENTS

Figure 1:
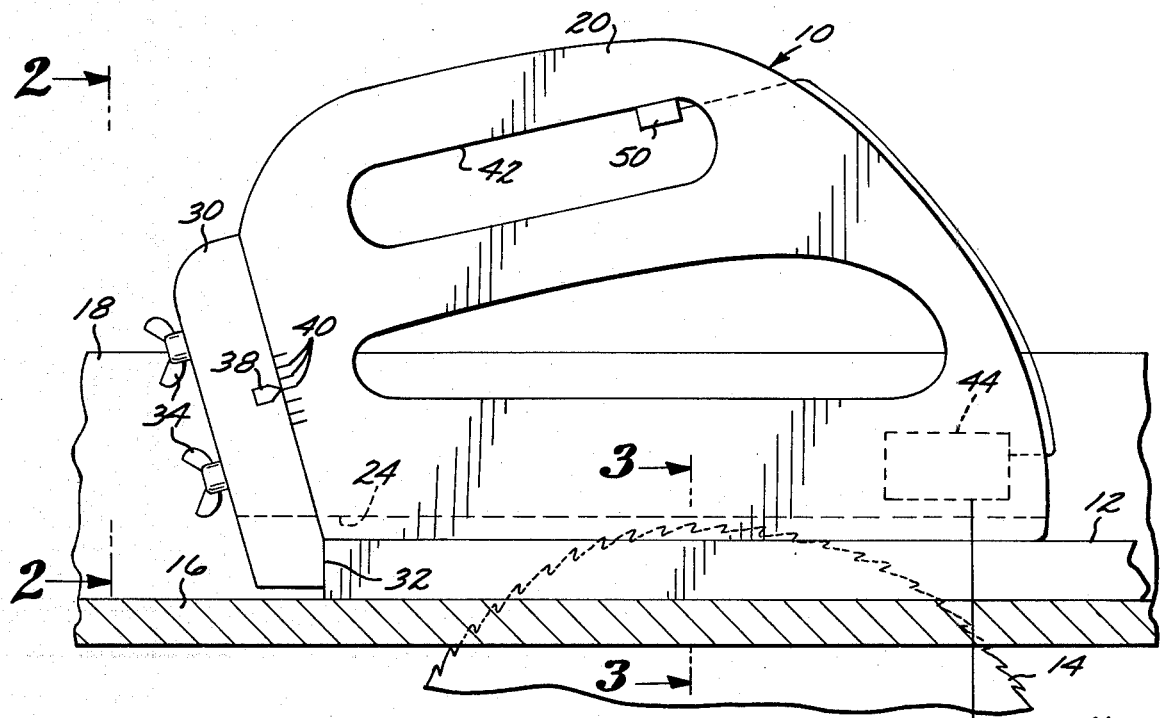
FIG. 1 is a side elevational view of the present hand guard, portions thereof being diagrammatically illustrated.
Figure 2:
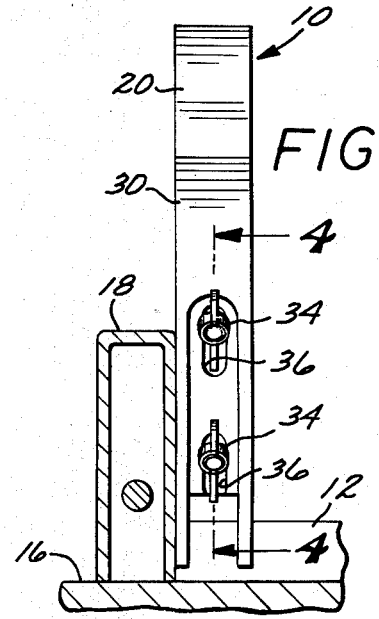
FIG. 2 is a view taken along the line 2—2 of FIG. 1.

Referring now to the drawings, there is illustrated a hand guard 10 according to the present invention which is particularly adapted for use in connection with a power operated table saw. The disclosure which follows therefore describes the hand guard 10 as it would be used in a typical table saw application. However, the hand guard 10 is also adapted for use in association with other table mounted cutting tools in which a portion of the tool projects upwardly through the table. This would include, for example, routers, jointers, and even grinding or dressing elements operating upon a piece of work moved across a table. Consequently, the present disclosure should be construed broadly to cover all such applications.

In a typical table saw application, a wooden board or work 12 to be cut or ripped is advanced past a circular saw blade 14 projecting upwardly through a table 16.

A rip fence or guide rail 18 attached to the table 16 projects upwardly in perpendicular relation to the upper surface of the table 16, and in a plane spaced from and parallel to the plane of the saw blade 14, the spacing being dependent upon the width of material to be cut from the work 12. The hand guard 10 is positioned upon the work 12 as illustrated and is employed to push the work 12 past the blade 14.

The hand guard 10 includes a vertically oriented guide body 20 made of transparent plastic material which enables the operator to view the cutting area at all times. The body 12 is characterized by flat side portions so that it is slidable along the guide rail 18.

Figure 3:
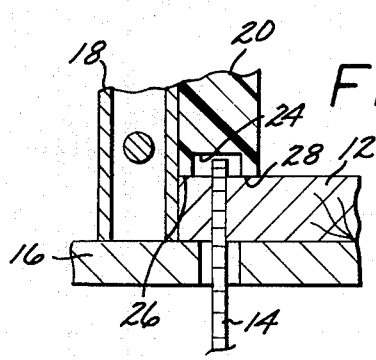
FIG. 3 is a view taken along the line 3—3 of FIG. 1.

The body 20 includes an underside 22 engageable with the upper surface of the work 12 and including an elongated channel or recess 24 throughout its length. The recess 24 defines a pair of laterally spaced apart, downwardly extending guide body portions 26 and 28, as best seen in FIG. 3. The portion 26 is adapted to engage and hold down narrow strips cut from the work 12, as will be apparent.

The forward and upper edge portions of the guide body 20 are arcuately configured to eliminate rough corners which might catch the operator's clothing. The rearward or trailing edge of the body 12 is downwardly and forwardly inclined for slidably mounting a vertically elongated heel 30. Downward, generally vertical movement of the heel 30 projects the lower extremity of the heel below the guide body underside for positive engagement of the forward portion 32 of the heel 30 with the trailing edge of the work 12.

Figure 4:
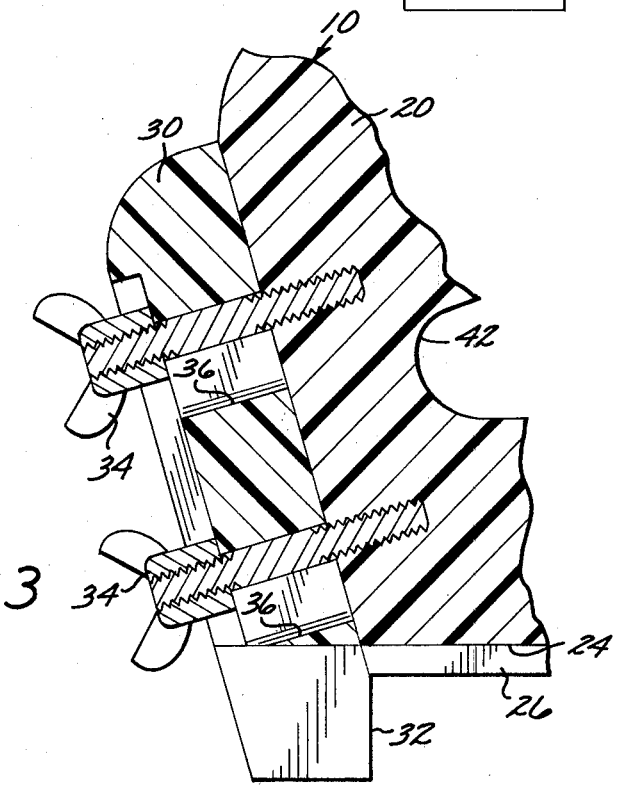
FIG. 4 is an enlarged view taken along the line 4—4 of FIG. 2.

Adjustment means on the heel 30 and guide body 20 cooperate to fix the heel 30 in one of various vertically adjusted positions to accommodate various thicknesses of work 12. In the present embodiment the adjustment means takes the form of a pair of wing nuts 34 which pass through suitably elongated slots 36 in the heel 30 and into threaded openings in the trailing edge portion of the guide body 20, as best seen in FIG. 4.

Indicia means are preferably provided to display the various adjusted positions of the heel 30, the indicia taking the form of an indicator arrow 38 imprinted on the heel 30 and alignable with one of various indicating lines 40 on the adjacent portion of the guide body 20.

The guide body 20 includes an elongated hand slot 42, as seen in FIG. 1. The slot 42 extends through the flat sides of the guide body and slopes upwardly in a leading direction so that the guide body 20 can be manually thrust in a leading direction with a vector of the thrust force tending to press the guide body 20 downwardly and firmly against the work 12.

In operation, the underside 22 of the guide body is placed upon the work 12 adjacent the guide rail 18. The wing nuts 34 are loosened to permit the heel 30 to be moved downwardly so that its forward portion 32 is engaged upon the trailing edge of the work 12. The wing nuts 34 are then tightened and the operator pushes against the hand guard 10, positively engaging and moving the work 12 past the saw blade without possibility of injury.

If desired, a suitable signal transmitter means 44 can be embedded or otherwise attached to the guide body 20 to enable operation of the saw by the operator without releasing the guard 10. The transmitter means 44 can be in the form of a radio frequency or any similar transmitter adapted to generate a signal which can be converted by a suitable receiver means 46 into suitable actuation of a motor 48 which drives the blade 14. With such a system, the operator need only grasp the guard 10 and, as soon as the work 12 is in position for cutting, press a suitable guide body mounted trigger 50 which is electrically coupled to the transmitter means 44, thereby turning on the saw motor 48. As will be apparent, the trigger 50 can be a "deadman" switch such that the motor 48 automatically shuts off whenever the operator releases the guard 10.

Various modifications and changes may be made with regard to the foregoing detailed description without departing from the spirit of the invention.

I claim:

1. A hand guard for a table mounted rotating cutting tool, said hand guard comprising:

a vertically oriented guide body having flat side portions for slidable engagement with a table mounted guide rail of predetermined height, and including an underside adapted to rest on top of work to be advanced past a rotating cutting tool and along a path parallel to said guide rail, said guide body further having an elongated hand slot extending through said flat side portions and sloping upwardly in a leading direction whereby said guide body can be manually thrust in said leading direction with a vector of said thrust tending to press said guide body downwardly upon said work, said hand slot being adapted for location above said predetermined height of the guide rail whereby a user's hand will clear the upper edge of said guide rail;

a heel mounted to the trailing extremity of said guide body for generally vertical movement to project the lower extremity of said heel below said guide body underside for positive engagement with the edge of said work whereby said work may be moved past said cutting tool by manually grasping the upper portion of said guide body and moving it toward said cutting tool, said lower extremity of said heel including a channel to accommodate a cutting tool passing upwardly of said underside of said guide body during ripping of said work; and adjustment means on said heel and said guide body cooperative to fix said heel in one of various vertically adjusted positions relative to said guide body to accommodate various thicknesses of work.

2. A hand guard according to claim 1 and including indicia means on said heel and said guide body cooperative to display attainment of each of said adjusted positions.

3. A hand guard according to claim 1 wherein said underside includes a recess defining a narrow, downwardly extending guide body portion for location adjacent said guide rail to facilitate cutting of narrow strips of said work.

4. A hand guard according to claim 1 and including a trigger operable signal transmitter means carried by said guide body adapted to actuate a receiver means coupled to said saw.

5. A hand guard according to claim 1 wherein said guide body is transparent.

* * * * *